United States Patent Office 3,378,958
Patented Apr. 23, 1968

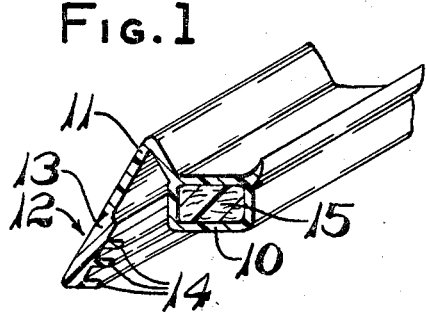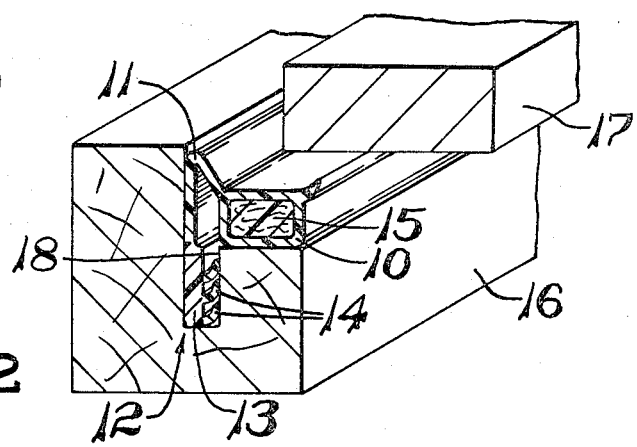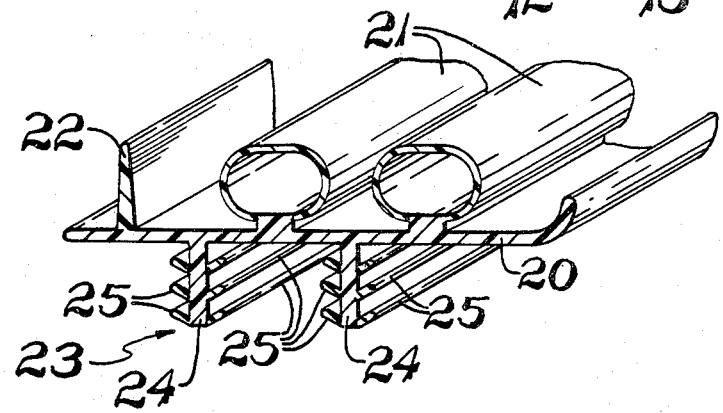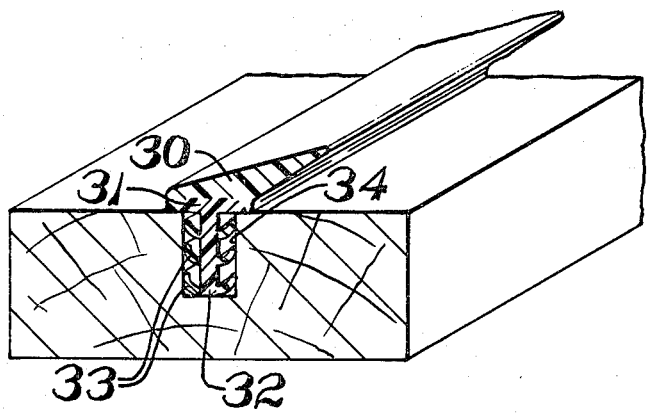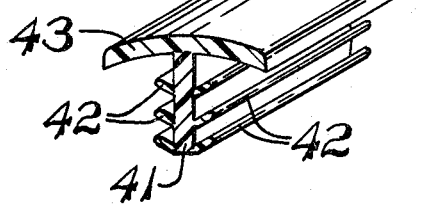
INVENTORS
SHELDON A. PARKS
HOWARD J. NAESER
BY W. A. Shira, Jr.
ATTY.

3,378,958
EXTRUSIONS HAVING INTEGRAL PORTIONS OF DIFFERENT STIFFNESS
Sheldon A. Parks and Howard J. Naeser, Marietta, Ohio, assignors to The B. F. Goodrich Company, New York, N.Y., a corporation of New York
Continuation-in-part of application Ser. No. 434,385, Feb. 23, 1965. This application Sept. 21, 1966, Ser. No. 581,039
17 Claims. (Cl. 49—489)

ABSTRACT OF THE DISCLOSURE

Extruded plastic sealing gaskets and trim strips having an integral stiff attaching rib with flexible fins for inserting into a narrow mounting groove, characterized by the fins being formed of a material having lesser stiffness than that employed for the rib.

---

This application, which is a continuation-in-part of our copending application, Ser. No. 434,385, filed Feb. 23, 1965, relates to improvements in extrusions having integral portions of different stiffness. More particularly, the invention herein disclosed and claimed relates to an improved mounting or attaching means for elongated extrusions that include portions providing a decorative and/or utilitarian function as, for example, the effecting of a seal between a wall member having an opening therein and a closure for that opening.

It is frequently necessary to provide a thermal and/or air barrier between a closure member for an opening and the portion of the cabinet or frame member defining the periphery of that opening. For this purpose an elongated sealing device is usually employed which is attached to one of the members forming the periphery of the opening and is disposed so that it will be engaged by the other of the members. For example, door seals or gaskets are provided on refrigerator and freezer doors; and, in modern buildings, threshold and edge seals are provided for outside doors.

The above-mentioned sealing devices or gaskets are usually made of elastomeric materials, for example, synthetic or natural rubber or synthetic plastics, by extruding the material to form a deformable sealing portion and an integral attaching portion. The properties of deformability and flexibility which render these materials ideally suited for the sealing function, however, render the attaching portion too highly susceptible to tearing and/or too flexible for use as a means for direct attachment to either of the two members between which the seal is to be effected. Consequently, it is generally necessary to employ mounting strips of metal or other rigid material for securing the sealing device in place. In the event an adhesive is employed in place of mechanical means of fastening, the preparation of the surfaces and application of the adhesives are time-consuming and hence expensive. Moreover, improper surface preparation and/or use of inferior or improper adhesive may result in unsatisfactory retention of the sealing device. Similar difficulties have heretofore been encountered in mounting trim or decorative strips over the joints of wall panels or upon other surfaces.

The principal object of this invention is, therefore, to provide an extrusion having an integral attaching portion comprising a rib with projecting fins wherein the rib is stiff in comparison with the fins which are formed of a composition having greater flexibility than that of the rib so that the extrusion can be mounted upon a surface having a narrow elongated recess by inserting the attaching portion into the recess without the need of tools, and the extrusion is firmly retained without independent fasteners or adhesives.

A further object of the invention is to provide an extrusion having an attaching portion, as defined in the preceding paragraph, integral with a sealing portion which is formed of more flexible material than the material of the rib of the attaching portion.

A more specific object of the invention is to provide an integral extrusion, as defined above, formed entirely of a synthetic plastic capable of having its stiffness reduced by the addition thereto of a plasticizer with the stiffer portions of the extrusion having a lesser proportion of plasticizer than the portions of greater flexibility.

Further objects and advantages of the invention will be apparent from the following description of the preferred embodiment of the invention, and certain modifications thereof, described with reference to the attached drawings, forming a part of this application, and in which:

FIG. 1 is an enlarged view, partially isometric and partially in transverse section, illustrating a closure sealing member incorporating this invention;

FIG. 2 is a view similar to FIG. 1 and shows the same embodiment mounted upon the frame member surrounding an opening in a wall for a door closure;

FIG. 3 is a view similar to FIG. 1 illustrating the presently preferred form of the invention as it is embodied in a threshold strip for the door of a building;

FIG. 4 is a view similar to FIG. 2 showing the invention embodied in a different form of sealing member and installed in operative position; and FIG. 5 is a view similar to FIG 1 illustrating yet another embodiment of the invention.

Referring first to FIGS. 1 and 2, the invention is illustrated as it is embodied in an elongated member for effecting a seal between an opening in a wall and a closure for that opening. As shown, the member comprises a longitudinally extending sealing portion 10, preferably generally rectangular in cross-section, formed of flexible deformable material. A flexible hinge portion 11, integral with the sealing portion, extends from one edge of the rectangular sealing portion and unites it to an attaching portion 12. The attaching portion comprises a rib 13 of stiffer material than that of the sealing portion 10 or of the hinge 11 and extends longitudinally of the member. The attaching portion 12 also includes a plurality of flexible fins 14 which are integrally formed upon a side of the rib 13 and extending longitudinally therealong in parallel spaced relation and obliquely outwardly toward the sealing portion 10 thereby making an acute angle with the rib 13. The hollow sealing portion 10 is preferably provided with an elongated permanent magnet 15 to serve as a door retaining means when the door is formed of magnetically permeable material.

The sealing member shown in FIGS. 1 and 2 with its integral attaching portion is formed as a unitary extrusion from materials that have different compositions in different parts thereof each appropriate to the function performed by the part. Thus, the walls of the hollow sealing portion 10, the hinge portion 11 and the fins 14 are formed of a material which is of greater flexibility for a given sample of predetermined dimensions than is a like dimensioned sample of the material which forms the rib 13. Preferably, the materials of different stiffnesses are made of the same synthetic resin but contain differing amounts of plasticizer. By way of example, the material may be polyvinyl chloride with the rib 13 formed of such material without plasticizer or with less plasticizer than the other portions of the member, such as 10, 11 and 14, which are more flexible and contain plasticizer in sufficient quantity to impart the requisite flexibility.

One convenient manner of determining the proper degree of respective flexibility and stiffness for the several portions of the sealing member is by measuring the hardness of the extruded materials since flexibility of an elastomer is directly related to the hardness as measured by a durometer. Thus, it has been found that the required differences in flexibility for satisfactory operation of the several parts of the sealing member, in accordance with this invention, are achieved when the stiffer portion has a hardness within the range measurable by a type D Shore durometer whereas the parts of the sealing member having the greater flexibility should have a hardness within the range measurable by a type A Shore durometer. More specifically, the stiffer portion of the extrusion preferably has a hardness which results in a reading up to 80 on the type D Shore durometer and the material comprising the flexible portion preferably has a reading not less than 55 nor greater than 75 on the Shore A scale durometer. The hardness of the stiffer portion may, however, fall within the range extending from the upper limits of the Shore A scale, for example, in the order of a reading of 90 on the Shore A scale, to the aforementioned reading of 80 on the Shore D scale. Within the aforementioned range of readings, it is possible to employ a wide range of combinations of relative stiffnesses for the several parts.

The extrusion embodying this invention can be made by known dual extruding equipment of the type employing two separate extrusion chambers feeding a common extrusion die with one of the extruders provided with the stiffer material and the other extruder provided with the more flexible material. Hence, both the stiffer and more flexible materials issue from the die as a single integral strip which may be cut to desired length. Although plasticized and unplasticized polyvinyl chloride have been mentioned as the preferable materials for forming the flexible and stiffer portions, respectively, of the extrusion, the invention is not limited to that material but encompasses other synthetic resins which are capable of being extruded simultaneously in compositions having different stiffnesses.

Referring now to FIG. 2 the embodiment of the invention illustrated in FIG. 1 is shown mounted for service as a seal for door 17 by being installed in the frame 16. This is effected by providing a recess or groove 18, with depth greater than width, in the frame into which the attaching portion 12, consisting of rib 13 and fins 14, is inserted. The recess or groove 18 is formed with parallel sides, of a width which is less than the combined undistorted width of the fins 14 and thickness of rib 13 and with a depth greater than that of the attaching portion. Installation is effected by aligning the attaching portion in superposed relationship to the recess or groove 18 and then manually pressing upon the member. This causes the attaching portion 12 to enter the recess or groove with the fins 14 deflecting as shown so that they resist withdrawal by exerting a force on the side of the recess in an amount which exceeds that required to effect the insertion. This holding action of the attaching portion can, of course, be increased by providing both sides of the rib 13 with flexible fins 14.

Referring now to FIG. 3, the invention is illustrated in its presently preferred embodiment as it is incorporated in a threshold strip for a door. As here shown, the strip is a unitary extrusion comprising a longitudinally extending base portion 20 of rigid plastic one surface of which is provided with a flexible sealing means while the opposite surface is provided with the improved attaching means. The sealing means as here illustrated comprises a pair of transversely spaced flexible walls 21 each defining an elongated hollow deformable chamber extending longitudinally of the strip 20. The flexible walls 21 are formed of plastic more flexible than that of the base portion with the edges of the walls terminating in an integral union with the base portion. A longitudinally extending wiper blade 22 of flexible plastic material is also formed integrally with the same surface of the base as that provided with the walls 21 defining the hollow chambers, the said wiper blade extending at generally right angles from the base and in parallel spaced relation to the hollow chambers.

The opposite side of the base portion is provided with an attaching portion 23 comprising a pair of longitudinally extending ribs 24 formed, integrally with the base portion 20, from stiff plastic material preferably having the same stiffness as the base. The ribs 24 extend at substantially right angles from the base in laterally spaced parallel relation, and each side of each rib is provided with a plurality of spaced flexible fins 25. These fins are formed as integral longitudinal projections on the ribs but the plastic material comprising the fins is more flexible than that of the ribs. Each fin extends obliquely outwardly from the rib on which it is formed toward the base 20 making an acute angle with the rib.

The base portion 20 serves as a substantially rigid support for both the more flexible sealing means and for the attaching portion so that the strip is installed upon the threshold by providing it with two parallel grooves, extending the width of the door opening in parallel relationship and spaced a distance corresponding to the spacing of the ribs 24, and pushing the ribs into the grooves. The flexible walls 21 defining the hollow sealing chambers and the wiper blade 22 are thus positioned so that the door, when closed will deform the walls 21 and wiper 22 upon contact, thereby effecting a seal between the door and the threshold. The threshold strip is firmly retained in position by the gripping force of the fins 25 upon the side walls of the recesses or grooves in which they are received, the fins being deflected, when so positioned, in the same manner as the fins 14 as illustrated in FIG. 2.

The walls 21, blade 2 and fins 25 may be formed of plastic material of the same or different flexibility but all should preferably be such as to provide a reading of not less than 55 nor more than 75 on the Shore A scale durometer. The base portion 20 and ribs 24 should, as noted above, be formed of stiffer material such as to provide a reading of not less than 90 on the Shore A scale and preferably within the range measurable on the Shore D scale durometer of up to a reading of 80 thereon. As explained for the embodiment illustrated in FIGS. 1 and 2, the desired stiffness may be provided by forming all parts of the strip of polyvinyl chloride and utilizing more plasticizer in the more flexible portions than in the stiffer portions.

The dimensions of the ribs 24, fins 25, and recesses or grooves in which these are received are interrelated but can be varied through substantial ranges without loss of effective holding action. As one example, the width of the recesses for receiving the attaching portion of a sealing member as illustrated in FIG. 3 were in the range of 0.100 in. to 0.130 in. with the depth of the recesses or grooves exceeding their width, the recesses or grooves having parallel sides and a depth equal to or greater than the depth of the ribs 24 received therein. The overall width of the attaching portion must, of course, exceed the width of the recess or groove and, for a recess or groove within the range of 0.100 in. to 0.130 in. the combined width of the rib 24 and its fins 25 should exceed by approximately 0.046 in. the width of the recess. The fins 25 may be formed to any convenient width and thickness that will provide adequate holding force in the particular recess or groove in which they are to be employed. For effective holding action in grooves of the dimensional range just mentioned, the fins are preferably 0.030 in. thick at the base and taper to a thickness of approximately 0.015 in. at the free edge. The fins are preferably formed at an oblique angle of 45° with respect to the rib for convenience of extrusion die design, but the size of the angle is not critical and may be other than 45°. The number and spacing of the fins along the rib is not critical so long as the ribs are all contained within the mounting recess or groove when the strip is installed with each fin contacting a wall of the recess or groove and with no fin resting upon another fin.

Each rib of the attaching portion should be more rigid than the fins in order to firmly maintain its shape without deforming when the strip is mounted by pushing the attaching portion into a recess or groove. This eliminates the need for special tools to effect installation. The greater compliance of the more flexible fins permits them to deflect readily during insertion in the recess, yet causes them to substantially increase the frictional force exerted upon the walls of the recess when removal is attempted. The greater rigidity of the ribs assists in the retention by preventing buckling of the ribs thereby insuring proper continuous engagement of the fins with the walls of the recesses or grooves.

The embodiment of the invention illustrated in FIG. 4, which is formed as a unitary extrusion, comprises a sealing portion 30 of flexible material formed integrally with and extending longitudinally upon an elongated base portion 31 of more rigid material. The sealing portion 30 extends obliquely outwardly from the base portion and is of tapered cross section. An attaching portion comprising a rigid rib 32 extends from the base portion 31 and has flexible fins 33 extending obliquely therefrom, the rib 32 and fins 33 corresponding in nature and function to the ribs 24 and fins 25 of the embodiment illustrated in FIG. 3. The instant embodiment is installed, as previously explained for the other embodiments, by providing a recess or groove 34, similar to the recess or groove 18, in the mounting member into which the attaching portion is pushed thereby deflecting the fins 33, as illustrated, to firmly retain the sealing portion 30 in position for sealing cooperation with a movable member, not shown. The greater flexibility of the fins and of the tapered sealing portion than that of the base and ribs is achieved in the manner and within the range of values heretofore given for the respectively flexible and stiffer portions of the other embodiments.

FIG. 5 illustrates the invention as it is embodied in an extruded trim member that may be employed for decorative purposes. As herein shown, the member comprises an attaching portion including a stiff rib 41 and integral, obliquely projecting flexible fins 42 formed in the same manner and functioning in the same way as previously described for the ribs and fins of the other embodiments. The attaching portion of the instant embodiment is formed integrally with an elongated strip-like portion 43, here shown as convexo-concave in cross section, which may be of different color and/or different stiffness from that of the rib 41 as will now be apparent. The member is mounted by inserting the attaching portion in a suitable recess or groove to occupy the position as shown for the embodiment illustrated in FIG. 4 with the strip portion 43 disposed in superposed relation concealing the recess or groove.

The invention has been described primarily with reference to the use of plasticized and unplasticized polyvinyl chloride as the material for forming, respectively, the flexible and stiffer portions of the extrusions. It will be apparent, however, that the invention is not restricted to complete absence of plasticizer in the stiffer portions. Moreover, materials other than polyvinyl chloride may be employed provided that they are compatible so that, when extruded together, they remain united and will not separate nor have an inherent weaknes at the regions of union. It is to be further understood that when reference has been made heretofore in the description, and hereinafter in the claims, to materials of different stiffness, the expression is intended to refere to materials which exhibit such difference when specimens of like dimension are compared as distinguished from the difference in stiffness which is exhibited by members due solely to their differences in cross-sectional configuration rather than their composition.

The embodiments of the invention which have been specifically illustrated and described are not inclusive of all forms in which the invention may be employed. Thus, it will be readily apparent that the principles of this invention may be utilized for sealing or decorating members of configurations different from those illustrated and described. Hence, it is to be understood that the invention is susceptible of adaptations and variations within the spirit and scope of the appended claims.

Having thus described the invention, we claim:

1. A plastic extrusion adapted to be mounted on a surface having at least one elongated recess therein of greater depth than width and with the sides of said recess extending in generally parallel uniformly spaced relationship, the said extrusion comprising a flexible portion adapted to extend exteriorly of said recess and an integral attaching portion thereon, the said attaching portion including an elongated rib formed of a stiffer material than that of the first-mentioned portion with a free edge opposite the first-mentioned portion and with the said rib having a width less than the width of said recess, and a plurality of flexible fins extending obliquely from said rib, the said fins being formed from material more flexible than a like quantity of the material of said rib with one edge of each fin integrally united with the rib, the said fins extending in parallel spaced relationship with the outer edges of the fins directed away from the free edge of said rib, the total of the width of the rib and the distance of the outer edges of the fins from the rib being greater than the width of said recess, whereby the extrusion may be applied to the said surface by pushing the rib and fins into the recess with the fins deflecting toward said rib, and the said fins thereafter prevent withdrawal of the rib by engagement of the fins with the sides of the recess.

2. An extrusion as defined in claim 1 wherein there are at least two of said fins extending from each side of said rib.

3. An extrusion as defined in claim 1 wherein the said rib and fins are both formed of the same plasticizable synthetic resin with the said rib having a lesser proportion of plasticizer than said fins.

4. An extrusion as defined in claim 1 wherein the said fins have a durometer reading of not greater than 75 on the Shore A scale while the rib has a durometer reading of not over 80 on the Shore D scale and not less than 90 on the Shore A scale.

5. An extrusion as defined in claim 1 wherein the first-mentioned portion comprises an elongated strip adapted to extend over said recess and obscure the latter when said attaching portion is in said recess.

6. An extrusion as defined in claim 5 wherein said elongated strip is convexo-concave in cross section.

7. An extrusion as defined in claim 1 wherein said first-mentioned portion comprises an elongated strip formed of material of lesser stiffness than said rib and extending at an acute angle therefrom and from the said recess when the said attaching portion is in the latter.

8. An extrusion as defined in claim 1 wherein the width of said rib plus the undeflected extent of said fins laterally of said rib is approximately .046 in. greater than the width of said recess when the latter has a width in the range of .100 in. to .130 in.

9. A one-piece elongated extrusion adapted to provide a seal between a wall member having an opening and a closure member for that opening, the said extrusion comprising integral longitudinally extending portions formed of materials exhibiting different stiffnesses for samples thereof of like dimensions with the extrusion portion of lesser stiffness including a flexible wall which provides a sealing surface, an attaching portion adapted to be pushed into a mounting recess in one of said members, said attaching portion comprising a longitudinal rib of material of greater stiffness than the material of said flexible wall and with greater depth than thickness, a plurality of flexible longitudinal fins of material of lesser stiffness than said rib extending in parallel spaced relation at an acute angle from at least one of the elongated surfaces of said rib toward said flexible wall, and a flexible portion of material having a lesser stiffness than that of said rib intermediate said attaching portion and said sealing surface supporting said sealing surface in spaced relation to said attaching portion in a manner permitting movement of the sealing surface relative to said attaching portion.

10. An extrusion as defined in claim 9 wherein said flexible wall providing the said sealing surface is the outer wall of an elongated hollow chamber and said flexible supporting portion intermediate the attaching portion and the sealing surface is united to said hollow chamber adjacent one side thereof thereby providing a hinging action of the chamber to the attaching portion.

11. An extrusion as defined in claim 10 and further comprising an elongated permanent magnet in said hollow chamber.

12. An extrusion as defined in claim 10 wherein the said hollow chamber is rectangular in cross section with the said connection to said rib comprising a flexible wall generally U-shape in cross-section extending between one longitudinal edge of said rib and a longitudinal edge of said hollow chamber.

13. A one-piece elongated plastic extrusion adapted to effect a seal between a wall opening and closure for said opening comprising, an elongated base portion having opposed surfaces, an elongated readily deformable hollow chamber integrally joined with one surface of said base, at least one stiff longitudinal retaining rib integrally united with and projecting at substantially right angles from the opposite elongated surface of said base, a plurality of thin flexible gripping fins integrally united with and extending in parallel longitudinally spaced relation from at least one face of said rib toward said base at an acute angle with said rib, the said fins being formed of plastic material exhibiting lesser stiffness than the plastic material of said rib for samples thereof of like dimensions thereby enabling said extrusion to be mounted and retained by pushing said rib into an elongated recess having substantially parallel sides and narrower in width than depth, the combined width of said rib and distance from the rib to outer edges of said fins exceeding the width of said recess so that said fins are elastically deflected toward said rib when inserted in said recess, and exert a retaining force upon the side of said recess.

14. An extrusion as defined in claim 13 adapted to serve as a sealing strip for the threshold of a door characterized in that the said hollow longitudinal chamber is formed by a wall of flexible plastic material of lesser stiffness than said rib and having the shape of a closed plane curve in cross section with the edges of said wall terminating in and integral with said base portion, and the said base portion is formed of material having substantially the same stiffness as said rib.

15. An extrusion as defined in claim 14 wherein there are two of said elongated hollow chambers in parallel spaced relationship on said base portion.

16. An extrusion as defined in claim 14 wherein said base portion is provided with two of said ribs extending in parallel spaced relationship and each provided with a plurality of said fins extending from each side of each rib.

17. A one-piece elongated plastic extrusion adapted to effect a seal between a wall opening and closure for said opening comprising, an elongated stiff base portion having opposed surfaces, a pair of elongated readily deformable hollow chambers each formed by a wall of flexible plastic having the shape of a closed plane curve in cross section with the edges of each said wall terminating in and integrally joined with one surface of said base, a deformable blade integral with said one surface of the base and extending parallel with and in laterally spaced relationship relative to said hollow chambers, a pair of stiff longitudinally extending retaining ribs integrally united with and projecting at substantially right angles from the opposite elongated surface of said base and extending parallel to each other in laterally spaced relationship, a plurality of thin flexible gripping fins integrally united with and extending in parallel longitudinally spaced relation from the opposite faces of each of said ribs toward said base at an acute angle with respect to said ribs, the said fins being formed of plastic material exhibiting lesser stiffness than the plastic material of said ribs and base for samples thereof of like dimensions thereby enabling said extrusion to be mounted and retained by pushing said ribs into elongated recesses having substantially parallel sides and narrower in width than depth, the combined width of each of said ribs and distance from each rib to outer edges of the fins thereon exceeding the width of each of said recesses so that said fins are elastically deflected toward the ribs when inserted in said recesses and exert a retaining force upon the sides of said recesses.

References Cited

UNITED STATES PATENTS

| | | | |
|---|---|---|---|
| 2,132,060 | 10/1938 | Tremblay | 49—489 |
| 2,140,844 | 12/1938 | Mirus-Leuschner | 49—490 |
| 2,180,886 | 11/1939 | Thomas | 49—489 |
| 2,736,076 | 2/1956 | Bush et al. | 49—495 |
| 2,908,949 | 10/1959 | Frehse | 49—497 |
| 3,004,308 | 10/1961 | Young | 49—469 |
| 3,164,869 | 1/1965 | Barkan | 49—479 |
| 3,177,534 | 4/1965 | Millhouse et al. | 49—490 X |
| 3,277,423 | 1/1966 | De Matteo | 256—12.5 |
| 3,238,573 | 3/1966 | Pease | 49—489 X |
| 3,276,167 | 10/1966 | Bus et al. | 49—485 |
| 2,819,065 | 1/1958 | Jones | 49—489 X |
| 3,226,367 | 12/1965 | Monti | 49—489 X |

DAVID J. WILLIAMOWSKY, *Primary Examiner.*

HARRISON R. MOSELEY, *Examiner.*

P. C. KANNAN, *Assistant Examiner.*